United States Patent
King et al.

(10) Patent No.: US 9,963,975 B2
(45) Date of Patent: May 8, 2018

(54) TRIP STRIP RESTAGGER

(71) Applicant: United Technologies Corporation, Hartford, CT (US)

(72) Inventors: Christopher King, Bristol, CT (US); Edward F. Pietraszkiewicz, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 535 days.

(21) Appl. No.: 14/616,999

(22) Filed: Feb. 9, 2015

(65) Prior Publication Data
US 2016/0230563 A1    Aug. 11, 2016

(51) Int. Cl.
| F01D 5/18 | (2006.01) |
| F01D 5/08 | (2006.01) |
| F01D 9/06 | (2006.01) |

(52) U.S. Cl.
CPC .............. F01D 5/187 (2013.01); F01D 5/08 (2013.01); F01D 5/18 (2013.01); F01D 5/186 (2013.01); F01D 5/188 (2013.01); F01D 9/065 (2013.01); *F05D 2230/30* (2013.01); *F05D 2260/2212* (2013.01); *F05D 2260/2214* (2013.01); *F05D 2260/22141* (2013.01); *Y02T 50/676* (2013.01)

(58) Field of Classification Search
None
See application file for complete search history.

(56) References Cited

U.S. PATENT DOCUMENTS

| 4,416,585 A | * | 11/1983 | Abdel-Messeh | ........ F01D 5/187 |
| | | | | 415/115 |
| 4,474,532 A | | 10/1984 | Pazder | |
| 4,515,526 A | | 5/1985 | Levengood | |
| 5,050,665 A | | 9/1991 | Judd | |
| 5,052,889 A | * | 10/1991 | Abdel-Messeh | ........ F01D 5/187 |
| | | | | 165/170 |
| 5,243,759 A | | 9/1993 | Brown et al. | |
| 5,403,159 A | * | 4/1995 | Green | ..................... F01D 5/187 |
| | | | | 416/97 R |
| 5,465,780 A | * | 11/1995 | Muntner | ................... B22C 9/04 |
| | | | | 164/369 |
| 5,486,090 A | * | 1/1996 | Thompson | .............. F01D 11/08 |
| | | | | 415/173.1 |
| 5,538,393 A | * | 7/1996 | Thompson | .............. F01D 25/12 |
| | | | | 415/115 |

(Continued)

FOREIGN PATENT DOCUMENTS

| EP | 0939196 A2 | 9/1999 |
| EP | 1637699 A2 | 3/2006 |
| WO | 2014105392 A1 | 7/2014 |

OTHER PUBLICATIONS

European Search Report for European Application No. 16154874.8 dated Jun. 30, 2016.

*Primary Examiner* — William McCalister
*Assistant Examiner* — Richard K Durden
(74) *Attorney, Agent, or Firm* — Carlson, Gaskey & Olds, P.C.

(57) ABSTRACT

A structure for creating a core for a gas turbine engine component comprises a body with a curved surface defining a turn passage. A plurality of protrusions are formed within a wall surface of the turn passage. A plurality of protrusions are configured to extend transversely relative to the curved surface. A gas turbine engine component is also disclosed.

20 Claims, 4 Drawing Sheets

(56) References Cited

U.S. PATENT DOCUMENTS

| | | | |
|---|---|---|---|
| 6,257,830 B1 * | 7/2001 | Matsuura | F01D 5/147 415/115 |
| 6,340,047 B1 | 1/2002 | Frey | |
| 6,474,947 B1 * | 11/2002 | Yuri | F01D 5/186 416/97 R |
| 7,217,095 B2 | 5/2007 | Pietraszkiewicz et al. | |
| 7,377,746 B2 | 5/2008 | Brassfield et al. | |
| 7,866,947 B2 | 1/2011 | Pietraszkiewicz et al. | |
| 8,353,329 B2 | 1/2013 | Gleiner et al. | |
| 8,366,383 B2 * | 2/2013 | Thibodeau | B22C 9/10 415/116 |
| 8,695,683 B2 | 5/2014 | Albert et al. | |
| 2007/0128028 A1 | 6/2007 | Liang | |
| 2008/0095636 A1 * | 4/2008 | Cherolis | F01D 5/187 416/97 R |
| 2013/0052037 A1 | 2/2013 | Abdel-Messeh et al. | |
| 2013/0327048 A1 | 12/2013 | Cunha et al. | |
| 2014/0079542 A1 | 3/2014 | Bullied et al. | |
| 2014/0086756 A1 * | 3/2014 | Papple | F01D 5/081 416/90 R |
| 2014/0093361 A1 | 4/2014 | Riley et al. | |
| 2014/0271129 A1 | 9/2014 | Mueller et al. | |

* cited by examiner

TRIP STRIP RESTAGGER

STATEMENT REGARDING FEDERALLY SPONSORED RESEARCH OR DEVELOPMENT

This invention was made with government support under Contract No. N68335-13-C-0005, awarded by the United States Navy. The Government has certain rights in this invention.

BACKGROUND OF THE INVENTION

In pursuit of higher engine efficiencies, higher turbine inlet temperatures have been relied upon to boost overall engine performance. This can result in gas path temperatures that may exceed melting points of turbine component constituent materials. To address this issue, dedicated cooling air is extracted from a compressor section and is used to cool the gas path components in the turbine, such as rotating blades and stator vanes for example, incurring significant cycle penalties.

One method of cooling turbine airfoils utilizes internal cooling channels or cavities formed in the airfoil to promote convective heat transfer. The cooling air is then discharged out of the airfoil through a plurality of holes. The cooling air exiting the holes forms a film of cooler air that shields the airfoil from incoming combustion gases.

Typically, these cooling holes and significant cooling mass flow rates are required to provide the needed amount of cooling. In order to effectively cool the airfoils to protect against damage, there is a need to balance the amount of cooling flow used and the overall heat transfer capability.

SUMMARY OF THE INVENTION

In a featured embodiment, a structure for creating a core for a gas turbine engine component comprises a body with a curved surface defining a turn passage. A plurality of protrusions are formed within a wall surface of the turn passage. A plurality of protrusions are configured to extend transversely relative to the curved surface.

In another embodiment according to the previous embodiment, each protrusion extends in a direction that is normal to the curved surface.

In another embodiment according to any of the previous embodiments, the curved surface protrudes outwardly from the wall surface.

In another embodiment according to any of the previous embodiments, the protrusions are spaced apart from each other.

In another embodiment according to any of the previous embodiments, the protrusions are defined by different lengths.

In another embodiment according to any of the previous embodiments, each protrusion extends from a first end to a second end and wherein the first ends are spaced apart from the curved surface.

In another embodiment according to any of the previous embodiments, the curved surface comprises an inner wall portion and includes an outer wall portion spaced apart from the inner wall portion by the wall surface. The second ends of the protrusions extend toward the outer wall surface.

In another embodiment according to any of the previous embodiments, the turn passage is defined by a first linear portion. A second linear portion is spaced apart from and generally parallel to the first linear portion. A third portion transitions from the first linear portion to the second linear portion about the curved surface.

In another embodiment according to any of the previous embodiments, the protrusions are generally positioned in the third portion.

In another embodiment according to any of the previous embodiments, longer protrusions are positioned between shorter protrusions.

In another embodiment according to any of the previous embodiments, the protrusions are spaced apart from each other.

In another embodiment according to any of the previous embodiments, the protrusions extend radially outwardly relative to the curved surface.

In another embodiment according to any of the previous embodiments, the gas turbine engine component comprises one of an airfoil, a blade, a vane, a BOAS, or a combustor panel.

In another embodiment according to any of the previous embodiments, the body includes an inner wall portion and an outer wall portion spaced apart from the inner wall portion by the turn passage. The wall surface extends from the inner wall portion to the outer wall portion. The curved surface comprises a terminal end of the inner wall portion.

In another embodiment according to any of the previous embodiments, each protrusion is defined by a length extending from a first end to a second end. The second ends of the protrusions do not contact the inner wall portion.

In another embodiment according to any of the previous embodiments, first ends of at least two adjacent protrusions are connected to each other via a curved surface.

In another embodiment according to any of the previous embodiments, the lengths of the protrusions vary.

In another embodiment according to any of the previous embodiments, the turn passage is defined by a first linear portion. A second linear portion is spaced apart from and generally parallel to the first linear portion. A third portion transitions from the first linear portion to the second linear portion about the curved surface. Each protrusion extends in a direction that is normal to the curved surface.

In another featured embodiment, a gas turbine engine component comprises a body including an internal turn passage extending about a curved surface. A plurality of trip strips are formed within a wall surface of the turn passage. The plurality of trip strips are configured to extend transversely relative to the curved surface.

In another embodiment according to the previous embodiment, each trip strip extends in a direction that is normal to the curved surface. The trip strips are defined by different lengths.

In another embodiment according to any of the previous embodiments, a method of manufacturing a gas turbine engine component includes the steps of: providing a body including an internal turn passage extending about a curved surface; forming a plurality of trip strips within a wall surface of the turn passage, wherein the plurality of trip strips are configured to extend transversely relative to the curved surface; and forming the trip strips using one of a casting, EDM, laser, or additive manufacturing method.

The foregoing features and elements may be combined in any combination without exclusivity, unless expressly indicated otherwise.

These and other features may be best understood from the following drawings and specification.

DETAILED DESCRIPTION

Figure 1:
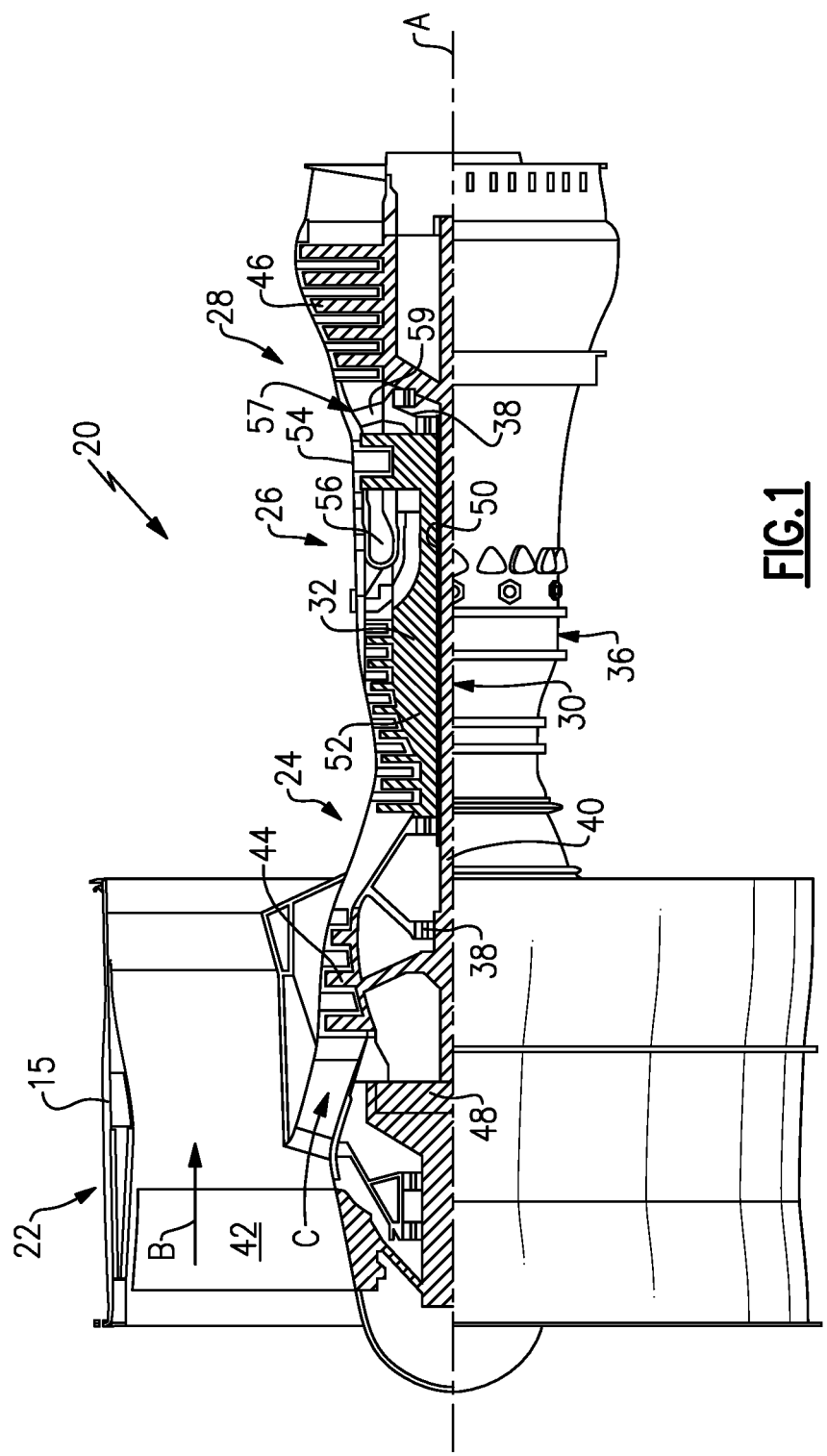
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
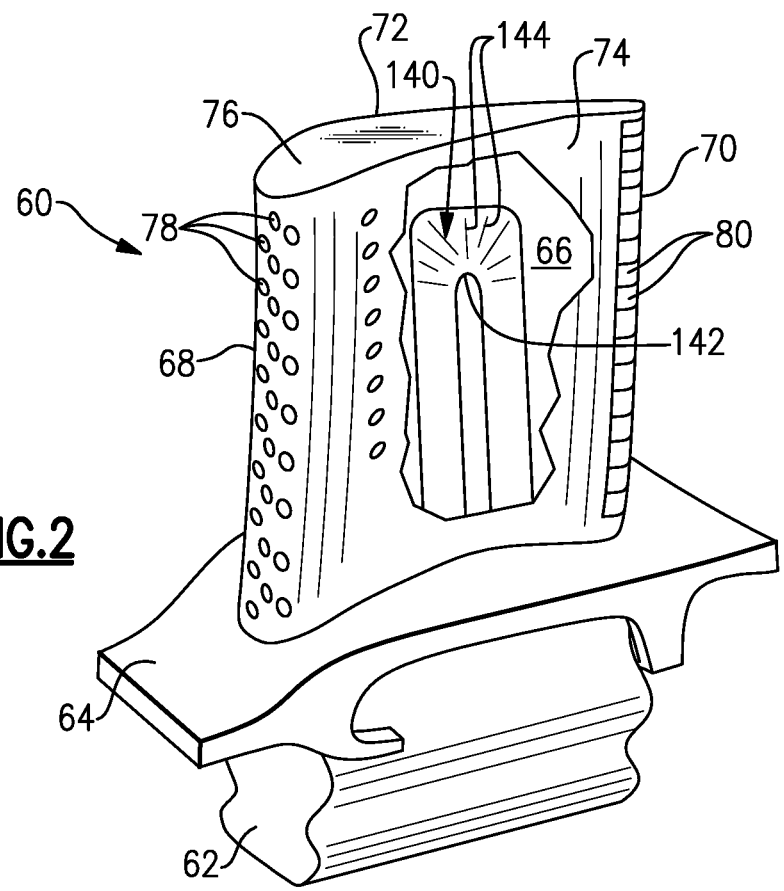
FIG. 2 is a side perspective view of a turbine blade.

Airfoils located downstream of combustor section 26, such as stator vanes and rotor blades in the turbine section 28 for example, operate in a high-temperature environment. Airfoils that are exposed to high temperatures typically include internal cooling channels that direct a flow of cooling air through the airfoil to remove heat and prolong the useful life of the airfoil. FIG. 2 is a schematic view of a turbine rotor blade 60 having a root section 62, a platform 64, and an airfoil section 66. Root section 62 is connected to a rotor in the turbine section 28 (FIG. 1) as known. The airfoil section 66 includes a leading edge 68, a trailing edge 70, a suction side wall 72, and a pressure side wall 74. The airfoil section 66 extends to a tip 76, and includes a plurality of surface cooling holes, such as film cooling holes 78, and a plurality of trailing edge cooling slots 80.

The platform 64 connects one end of airfoil section 66 to root section 62. The leading edge 68, trailing edge 70, suction side wall 72, and pressure side wall 74 extend outwardly away from the platform 64. The tip 76 closes off an opposite end of the airfoil section 66 from the platform 64. Suction side wall 72 and pressure side wall 74 connect leading edge 68 and trailing edge 70. Film cooling holes 78 are arranged over a surface of airfoil section 66 to provide a layer of cool air proximate the surface of airfoil section 66 for protection from high-temperature combustion gases.

Trailing edge cooling slots 80 are arranged along trailing edge 70 to provide an exit for air circulating within airfoil section 66.

Figure 3:
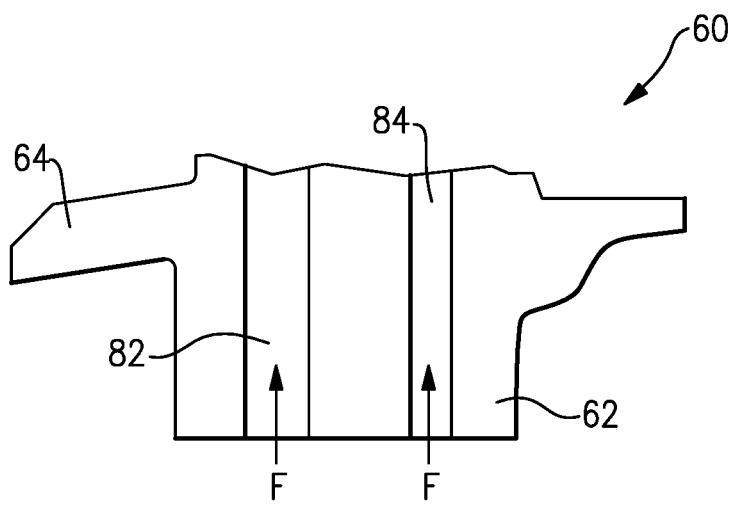
FIG. 3 is a schematic cross-sectional view of a root section of the blade of FIG. 2.

FIG. 3 is a schematic section view of the root section 62 of the rotor blade 60 of FIG. 2. The rotor blade 60 includes one or more internal cooling channels. In the example shown, there is at least a first cooling channel 82 near the leading edge 68, and a second cooling channel 84 positioned aft of the first cooling channel 82. The cooling channels 82, 84 direct cooling flow F radially outwardly toward the tip 76 of the blade 60. The cooling channels 82, 84 deliver cooling flow to the film cooling holes 78 and the cooling slots 80. The cooling channels internal to the airfoil section 66 can take various forms.

Figure 4:
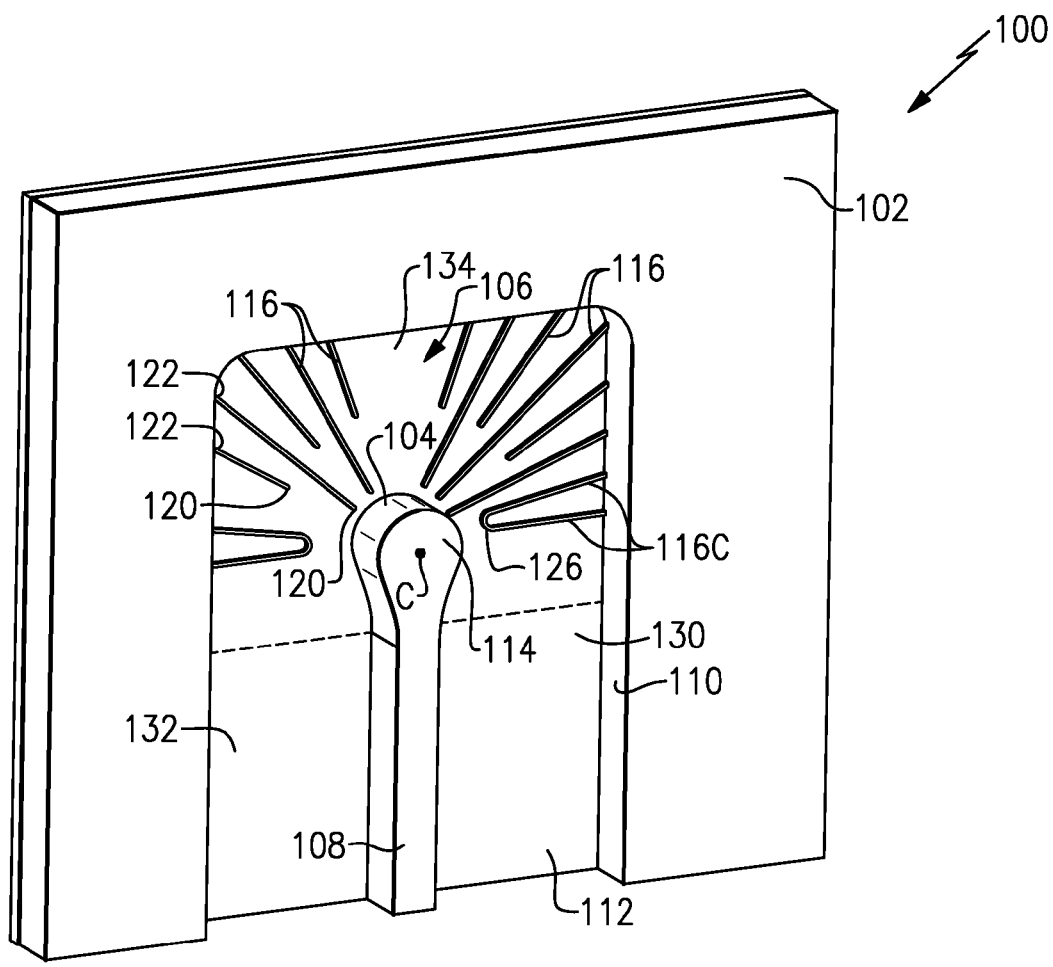
FIG. 4 is a perspective side view of structure used to form a core for a gas turbine engine component.
Figure 5:
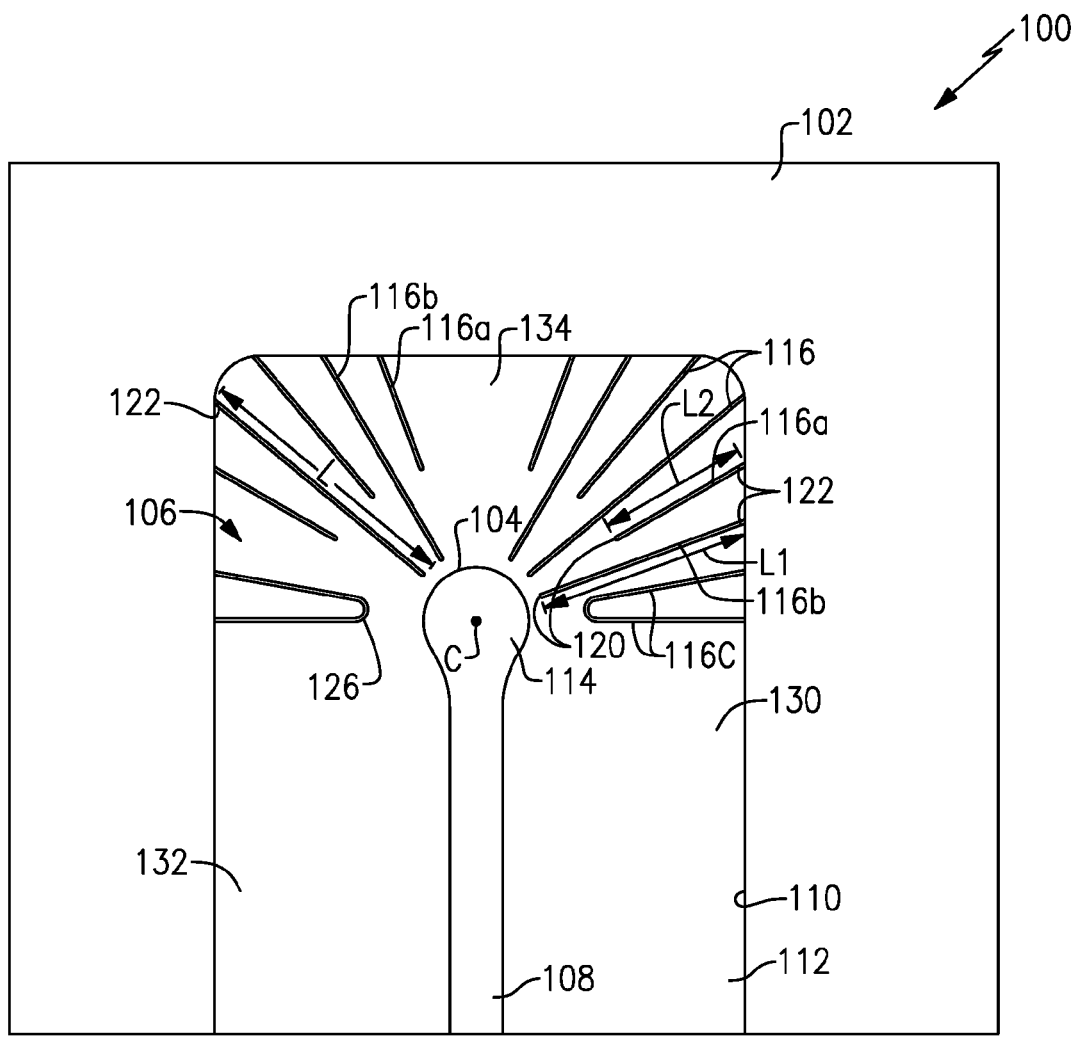
FIG. 5 is a side view of the structure of FIG. 4.

FIGS. 4-5 show a structure 100 for providing a sacrificial core that is used in making gas turbine engine components such as airfoils for a blade or vane, a blade outer air seal (BOAS), or a combustor panel, for example. As known, the core is used to define a shaped opening within the finished component. For example, the core is used to define the internal cooling channels 82, 84 the airfoil section 66. Typically, the core is formed from a ceramic material; however, other suitable materials could also be used.

In order to improve cooling efficiency, the subject invention provides a structure to create a feature on the ceramic core that will make cooling air flowing through the finished component have a more turbulent flow in order to provide better convection. Because the desired cooling flow through the internal cavities or channels is maintained for internal convection heat transfer, airfoil life is improved.

In one example, the structure 100 comprises a body 102 that provides a core with a tip turn configuration, i.e. a core that turns from going in a radially outward direction to a radially inward direction. The body 102 includes a curved surface 104 that defines a turn passage 106. The body 102 includes an inner wall portion 108 and an outer wall portion 110 that is spaced apart from the inner wall portion 108 by the turn passage 106. A wall surface 112 extends from the inner wall portion 108 to the outer wall portion 110. The curved surface 104 comprises extends around a terminal end 114 of the inner wall portion 108 from one side to an opposite side.

The inner wall portion 108 extends or protrudes outwardly from the wall surface 112, which in this example is a generally flat surface; however the surface 112 could also comprise contoured surface with variations. A plurality of protrusions 116 is formed within the wall surface 112 of the turn passage 106. In one example, the protrusions 116 are used to form trip strips in the cooling channels of the finished component.

The plurality of protrusions 116 are configured to extend transversely relative to the curved surface 104. The terminal end 114 of the inner wall portion 108 includes a center C that defines the curved surface 104. The protrusions 116 extend generally in a radial direction relative to the center C of the curved surface 104.

In one example, each protrusion 116 extends in a direction that is normal to the curved surface 104 as best shown in FIG. 5. In other words, the protrusions are individually orientated to be generally perpendicular to the curved surface 104. Further, the protrusions 116 are circumferentially spaced apart from each other about the curved surface 104 such that the protrusions are separated from each other by portions of the wall surface 112.

Each protrusion 116 extends from a first end 120 to a second end 122 to define an overall protrusion length L. The lengths of the protrusions 116 vary about the curved surface 104. Further, the protrusions 116 are staggered relative to each other with protrusions 116a having a shorter length L2 being positioned between protrusions 116b having a longer length L1. By shortening the lengths of some of the protrusions about the radius of curvature, more protrusions (e.g. trip strips) can be formed within the turn passage 106.

In one example, the first ends 120 are spaced apart from the curved surface 104 and the second ends 122 extend to the outer wall portion 110. In other configurations the second ends 122 may be spaced from the outer wall portion 110. As shown in FIGS. 4-5, the protrusions are shown as being generally straight; however, the protrusions could have different shapes and/or include curved portions. Also, for example, the first ends 120 of adjacent protrusions 116c can be connected to each other by a curved surface as indicated at 126.

As best shown in FIG. 5, the turn passage 106 is defined by a first linear portion 130, a second linear portion 132 spaced apart from and generally parallel to the first linear portion 130, and a third portion 134 that transitions from the first linear portion 130 to the second linear portion 132 about the curved surface 104. In the example shown, the protrusions 116 are generally positioned in the third portion 134. However, additional protrusions could be incorporated into the linear portions 130, 132 as needed to further improve cooling. As discussed above, the core is used to form a gas turbine engine component such as the rotor blade 60 as shown in FIG. 2. The core is used to form an internal turn passage 140 that extends about a curved surface 142. The turn passage 140 includes a plurality of trip strips 144 that are formed within a wall surface of the turn passage 140. The trip strips 144 are configured to extend transversely relative to the curved surface 142. In one example, each trip strip 144 extends in a direction that is normal to the curved surface 142. In one example, the trip strips 144 are defined by different lengths. The trip strips 144 can be formed as described above and/or by using any of various manufacturing methods including casting, EDM, laser, or additive manufacturing methods.

As discussed above, the subject invention provides a structure to create a feature on the ceramic core that will make cooling air flowing through the finished component have a more turbulent flow in order to provide better convection. The subject invention leaves a measurable witness around the tip turn to stagger the protrusions (measurable material witness), e.g. trip strips, in full lengths and partial lengths. This will increase the number of trip strips along the tip turn to provide a better heat transfer coefficient from having more trip strips on the pressure side. Further, by increasing the number of protrusions, the subject invention provides more material which increases conduction.

It should be understood that the subject invention is not limited to straight stagger strips but could include other shaped trip strips and non-full plunge trip strips, for example. Further, while the drawings show an airfoil section 66 for a blade, the core could also be used in a vane, a BOAS, a combustor liners or panels, or any other area that requires heat transfer convection.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A structure for creating a core for gas turbine engine component comprising:

a body with a curved surface defining a turn passage, wherein the curved surface comprises an inner wall portion and wherein the body includes an outer wall portion spaced apart from the inner wall portion by a wall surface, and wherein a terminal end of the inner wall portion includes the curved surface; and a plurality of protrusions formed within the wall surface of the turn passage, wherein the plurality of protrusions are configured to extend in a radial direction relative to the curved surface, and wherein each protrusion is defined by a length extending from a first end facing the inner wall portion to a second end facing the outer wall portion, and wherein first ends of at least two adjacent protrusions are connected to each other via a protrusion curved surface.

2. The structure for creating the core according to claim 1 wherein the curved surface protrudes outwardly from the wall surface.

3. The structure for creating the core according to claim 2 wherein the protrusions are spaced apart from each other.

4. The structure for creating the core according to claim 2 wherein the protrusions are defined by different lengths.

5. The structure for creating the core according to claim 2 wherein each of the first ends is spaced apart from the curved surface.

6. The structure for creating the core according to claim 5 wherein each of the second ends of the protrusions extend to contact the outer wall portion.

7. The structure for creating the core according to claim 2 wherein the turn passage is defined by a first linear portion, a second linear portion spaced apart from and parallel to the first linear portion, and a third portion that transitions from the first linear portion to the second linear portion about the curved surface.

8. The structure for creating the core according to claim 7 wherein the protrusions are only positioned in the third portion.

9. The structure for creating the core according to claim 7 wherein longer protrusions are positioned between shorter protrusions.

10. The structure for creating the core according to claim 1 wherein the gas turbine engine component comprises one of an airfoil, a blade, a vane, a BOAS, or a combustor panel.

11. The structure for creating the core according to claim 1 wherein each of the first ends of the protrusions do not contact the inner wall portion.

12. The structure for creating the core according to claim 1 wherein the lengths of the protrusions vary.

13. The structure for creating the core according to claim 1 wherein the turn passage is defined by a first linear portion, a second linear portion spaced apart from and generally parallel to the first linear portion, and a third portion that transitions from the first linear portion to the second linear portion about the curved surface.

14. A gas turbine engine component comprising:
a body including an internal turn passage extending about a curved surface, wherein the curved surface comprises an inner wall portion and wherein the body includes an outer wall portion spaced apart from the inner wall portion by a wall surface, and wherein a terminal end of the inner wall portion includes the curved surface; and a plurality of trip strips formed within the wall surface of the turn passage, wherein the plurality of trip strips are configured to extend radially relative to the curved surface, and wherein each trip strip is defined by a length extending from a first end facing the inner wall portion to a second end facing the outer wall portion, and wherein first ends of at least two adjacent trip strips are connected to each other via a protrusion curved surface.

15. The gas turbine engine component according to claim 14 wherein the trip strips are defined by different lengths.

16. The gas turbine engine component according to claim 14 wherein each of the second ends of the trip strips contact the outer wall portion and wherein each of the first ends of the trip strips are spaced apart from the inner wall portion.

17. The gas turbine engine component according to claim 14 wherein the turn passage is defined by a first linear portion, a second linear portion spaced apart from and parallel to the first linear portion, and a third portion that transitions from the first linear portion to the second linear portion about the curved surface, and wherein the trip strips are only positioned in the third portion.

18. A method of manufacturing a gas turbine engine component comprising:
providing a body including an internal turn passage extending about a curved surface, wherein the curved surface comprises an inner wall portion and wherein the body includes an outer wall portion spaced apart from the inner wall portion by a wall surface, and wherein a terminal end of the inner wall portion includes the curved surface;

forming a plurality of trip strips within the wall surface of the turn passage, wherein the plurality of trip strips are configured to extend radially relative to the curved surface, and wherein each trip strip is defined by a length extending from a first end facing the inner wall portion to a second end facing the outer wall portion, and wherein first ends of at least two adjacent trip strips are connected to each other via a protrusion curved surface; and forming the trip strips using one of a casting, EDM, laser, or additive manufacturing method.

19. The method according to claim 18 wherein each of the second ends of the trip strips contact the outer wall portion and wherein each of the first ends of the trip strips are spaced apart from the inner wall portion.

20. The method according to claim 18 wherein the turn passage is defined by a first linear portion, a second linear portion spaced apart from and parallel to the first linear portion, and a third portion that transitions from the first linear portion to the second linear portion about the curved surface, and wherein the trip strips are only positioned in the third portion.

* * * * *